United States Patent [19]

Harris et al.

[11] 4,026,717
[45] May 31, 1977

[54] ECONOMICAL, FINELY CONTROLLED CEMENT PRODUCTION

[75] Inventors: Philip H. Harris, Fort Worth; Virgil L. Sewell; James. L. Stevens, both of Dallas, all of Tex.

[73] Assignee: Texas Industries, Inc., Dallas, Tex.

[22] Filed: Sept. 8, 1975

[21] Appl. No.: 611,209

[52] U.S. Cl. .............................................. 106/100
[51] Int. Cl.² .......................................... C04B 7/44
[58] Field of Search .................................. 106/100

[56] References Cited
UNITED STATES PATENTS

| | | | |
|---|---|---|---|
| 3,233,973 | 2/1966 | Veo et al. | 106/100 |
| 3,835,873 | 9/1974 | Wildpaner | 106/100 |

*Primary Examiner*—J. Poer
*Attorney, Agent, or Firm*—James C. Fails

[57] ABSTRACT

Method and apparatus for manufacturing portland cement characterized by a plurality of steps. First, there is introduced into the feed end of a rotary kiln at a first rate a first mixture containing calcareous material for the cement; and at a second rate a second mixture including at least one of argillaceous material and siliceous material for the cement. Either or both mixtures may be coarsely ground. Next, there is introduced into the combustion zone of the kiln at a third rate a third mixture and a fuel, the third rate of the third mixture being complementary with the second rate of the second mixture and the first rate of the first mixture so as to form a balanced cement clinker for the cement, the cement clinker being discharged from the discharge end of the kiln for further processing into the desired final form of the cement.

Also disclosed are more specific embodiments including respective sampling and analysis procedures at a plurality of points in the kiln system and the respective altering of proportions of the mixtures to maintain an exceptionally high degree of on-line control over the quality of the final cement clinker; the admixture of the first and second mixtures with slurry for a combination process that has the advantages of both the wet and dry processes; the manufacture of special purpose cement; and the specific apparatus and advantages.

20 Claims, 4 Drawing Figures

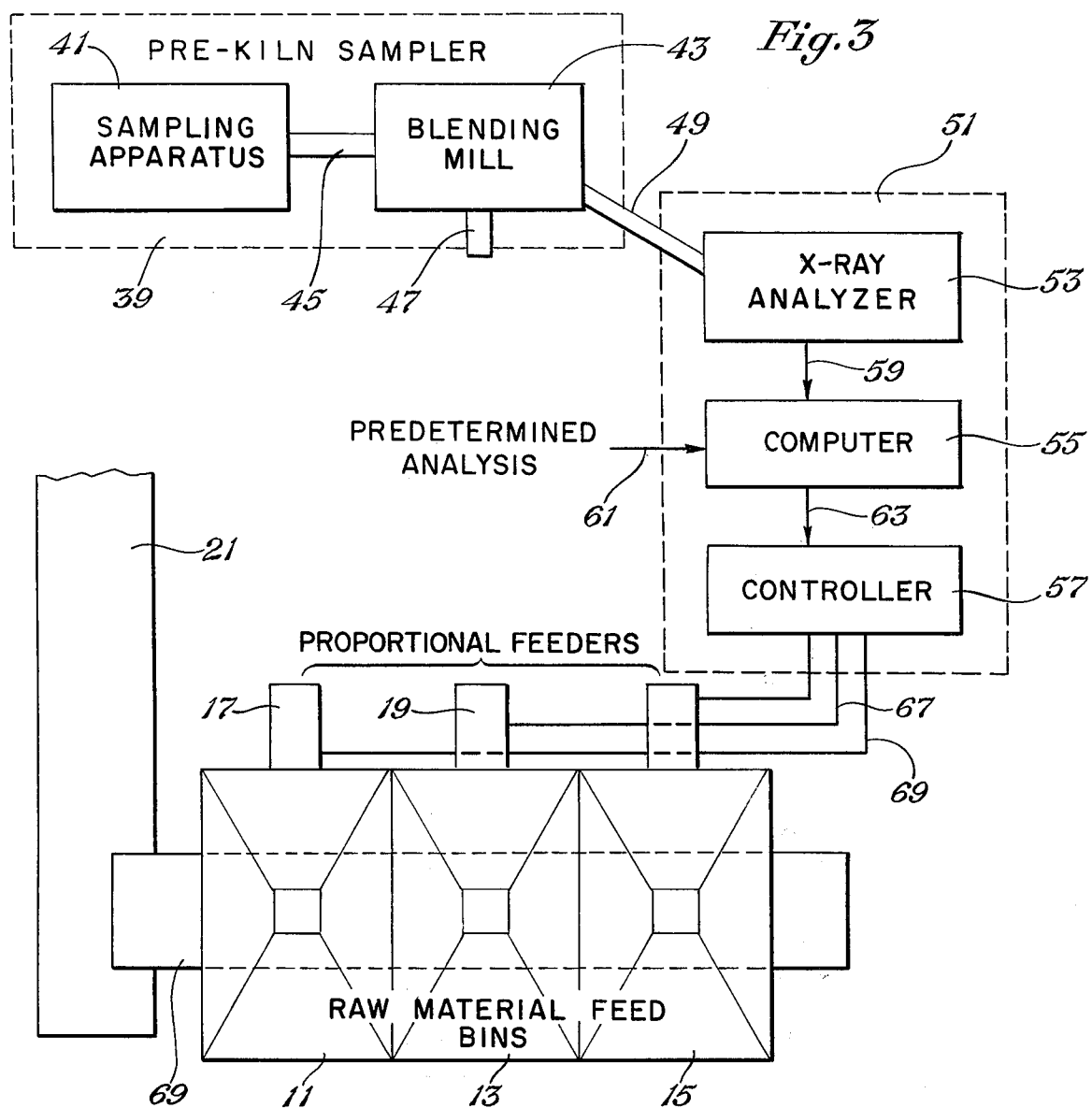

ECONOMICAL, FINELY CONTROLLED CEMENT PRODUCTION

BACKGROUND OF THE INVENTION

1. Field of the Invention:

This invention relates to method and apparatus for manufacturing portland cement. In current embodiments, it relates to a method and apparatus for manufacturing portland cement by way of a rotary kiln. In one aspect, it relates to obtaining enhanced control over the quality and specifications of cement clinker used for the cement.

2. Description of the Prior Art:

The prior art has seen many different approaches to the manufacture of cement, ranging from the earliest recorded history to modern day methods of manufacturing portland cement. The conventional processes in this country for manufacturing cement have generally comprised admixing predetermined proportions of calcareous and argillaceous, or siliceous, materials. The materials may be admixed with water to form a slurry or may be dried to form a dry, raw meal. In any event, the admixture is continuously fed into and burned within a cement forming kiln to form clinker. The resulting clinker is mixed and pulverized with gypsum to form dry powdered modern day portland cement.

The calcareous material may consist of limestone, marl, chalk, oyster shells and the like. The orgillaceous material may consist of clay, shale, slate, slag, fly ash, sand and the like. The proportions of these ingredients in the mixtures determines the resulting chemical composition of the clinker and the finished cement. Additives may be blended with one or more of the mixtures to provide the cement characteristics.

The different types of portland cement are well recognized and defined by the American Society of Testing Materials (ASTM). The most commonly manufactured cement is known as Type I, or general purpose cement. The remaining four types, Types II-V, are referred to as special purpose cements. These special purpose cements differ in the proportions of respective ingredients and are usually manufactured in lesser quantities.

To try to provide one or more of the features delineated hereinafter as desirable, a wide variety of artifices have been resorted to in the prior art. For example, issued U.S. patents as early as 1883, illustrated by U.S. Pat. No. 274,288, have disclosed addition of fuel with the argillo-calcareous raw materials for making cement. Many patents have issued since then with a similar idea. Such widely separated patents as U.S. Pat. No. 1,728,828 and U.S. Pat. No. 3,589,920 describe and claim the introduction of calcareous material into the burning zone of the kiln to form a satisfactory cement composition. Patents such as U.S. Pat. No. 2,477,262, describe and claim the classic insufflation process. Patents such as U.S. Pat. No. 3,437,329, describe introducing special additives into the combustion zone in which the fuel, such as coal, is burning to produce special purpose cements.

The latter patent has a good description of the need for flexibility in being able to change composition of the cement rapidly to eliminate the requirement for separate kilns for producing special purpose cement, as well as the other advantages inherent in the process described therein.

In our previously filed and co-pending application Ser. No. 546,271, entitled "Cement Production Having High Degree of Flexibility", filed Feb. 3, 1975, now abandoned, we described a method of making cement having a plurality of features not theretofore provided; and the descriptive matter of that application is embodied herein by reference for the details contained therein. Briefly, that invention included the use of coarsely ground calcareous material being fed into the feed end of the kiln with the complementary and finely ground portion of the material, including the siliceous material, being intimately admixed with the particulate fuel and fed into the combustion zone therewith for enhanced chemical activity and high temperature combustion. That invention enabled achieving significant advantages over the prior art theretofore, but still was not a completely perfect process.

Despite the wide variety of approaches tried, the prior art has not achieved a plurality of the desirable features delineated hereinafter.

The desirable features are:

1. The apparatus and process should allow fine control over the quality and specifications of the cement clinker even while achieving a plurality of the other features delineated hereinafter.

2. The apparatus and process should be flexible and be able to manufacture cement of different compositions readily without necessitating long periods of time to change over the operation of the kiln and related accessories and without requiring special purpose kilns.

3. Very importantly in the face of the current cost and scarcity of energy resourses, the method and apparatus should be more efficient and enable producing cement with a lower expenditure of energy than heretofore.

4. The method and apparatus desirably would have the combined advantages of the wet process of cement manufacture with the low heat loss and efficiencies closer to that of a dry process, without significant capital expenditure.

5. The process and apparatus desirably obtains enhanced chemical activity. Producing cement is notoriously slow. The reactions are now analogous to chemical reactions in which kinetics are controlled by solid state diffusion. Consequently, finely ground siliceous, or argillaceous and calcareous feed materials have been required. This was particularly burdensome but the experts have maintaned that there is a necessity for particle sizes less than 50 mesh if satisfactory cement clinker is to be produced in economically feasible residence times in the kiln.

6. The method and apparatus should reduce the expense of having to finely comminute, or grind, all of the feed material fed into the feed end of the kiln.

7. The method and apparatus should enable converting a conventional plant to this invention with relatively minor capital investment.

8. The method and apparatus should enable increasing the capacity of existing plants following conversion to this invention.

SUMMARY OF THE INVENTION

Accordingly, it is an object of this invention to provide method and apparatus that achieves a plurality of the features indicated to be desirable hereinbefore and not heretofore provided by the prior art.

Specifically, it is an object of this invention to provide method and apparatus that effect features 1, 3, 5, and 6-8; and in specific embodiments feature 4, in addition to feature 2.

These and other objects will become apparent from the descriptive matter hereinafter, particularly when taken in conjunction with the appended drawing.

The foregoing objects are accomplished in accordance with this invention by a multi-step process. First, there is introduced into the feed end of a kiln respective first and second mixtures. The first mixture includes calcareous material and is fed at a first rate. Rate is defined in the usual sense of a predetermined quantity per unit time, the quantity being commensurate with the form of the mixture. Ordinarily, in cement making, the rates are in predetermined weights of dry ingredients per unit time in order to afford a standard of comparison. The second mixture includes at least one of siliceous and argillaceous material and is fed into the feed end of the kiln at a second rate. The first and second mixtures are proportioned such that a balanced cement clinker will be formed as they traverse downwardly through the kiln and react at the high temperature within the kiln. As the ingredients traverse down the kiln, it may become apparent that there is a deficiency in one or more ingredients of the cement clinker that needs correction. Consequently, a third mixture that includes at least one of the siliceous and argillaceous materials is introduced at a third rate into the combustion zone where the fuel is being burned. Consequently, the third predetermined rate of the third mixture alters the proportion to supply the deficiency so as to produce a predetermined satisfactory cement clinker.

In specific embodiments of this invention that are most advantageous, the respective first, second and third mixtures may include coarsely ground material. For example, the first mixture may include coarsely ground calcareous material having dimensions up to three-eighths inch in lateral extent; the second mixture may include straight quarry run siliceous material, or otherwise coarsely ground material, to have dimensions up to one-fourth inch in lateral extent; and the third mixture may include straight run quarry material, although it is preferred that it not include material larger than about one-eighth inch in lateral dimensions, since it will react in a lesser portion of the kiln than the total length in which the second mixture has to react. For example, the total time of traverse down a kiln may be about 3½ to 4 hours; whereas the coarsely ground third mixture is introduced into the combustion zone in only about one-half that time so that it has only two hours or less time to react before the cement clinker exits the discharge end of the kiln.

When a finely ground third mixture is employed, it may be the same as or different from the coarsely ground third mixture. For example, the finely ground third mixture may be a fourth mixture including added special finely ground ingredients in order to rapidly react with and effect the desired cement clinker. When the finely ground mixture is introduced into the combustion zone with a particulate fuel, it has been found advantageous to intergrind the two to obtain intimate admixing. This produces a dispersant effect that enhances heat emission, produces a hot flame, and moves the finely ground ingredients into a chemically more excited state that reacts more rapidly to final cement clinker; with reaction times analogous to liquids or the like, instead of the normally much slower reaction.

In a still more specific embodiment of this invention, the first and second mixtures are coarsely ground and are fed by respective proportioning feeders onto a conveyor belt in the predetermined proportions. The resulting admixture is sampled as it traverses toward the feed end of the kiln. The samples are analyzed by rapid analysis means. The resulting respective analyses are compared with a predetermined analysis automatically; and the respective proportioning feeders are corrected to effect the desired predetermined proportions that alleviate the deficiencies. In this embodiment, the materials in the kiln and the final cement clinker that is discharged from the kiln are sampled, respectively. The samples are analyzed by rapid analysis means. The respective analyses are automatically compared respectively with a predetermined analysis and a desired cement clinker and the respective third rate of the third mixture and the fourth rate of the fourth mixture, or finely ground third mixture, are altered to eliminate the deficiency, and maintain specifications.

In the apparatus aspects of this invention, the respective rapid analysis means are connected with a computer. The output from the computer feeds via a controller back to the respective proportioning feeders in order to alter the respective rates of the respective mixtures. This aspect of providing an on line control that controls very finely the specifications of the cement clinker is not only advantageous from the control point of view, but is economically most advantageous in enabling converting a plant to this invention while saving large sums of money, compared to conventional conversion apparatus.

An aspect of this invention that is commercially significant in implementing this invention in existing cement manufacturing plants is the combining of this invention with a conventional process. In the combined process, 1/4 portion of the feed is the coarsely ground first and second mixtures incorporating the calcareous and the siliceous and argillaceous materials and the remainder is a conventional kiln feed. This avoids overloading the coal grinding facilities, of coal mills and the like, as could happen if the plant were converted to solely the use of the coarsely ground first mixture incorporating the calcareous material in the feed end of the kiln. This aspect is particularly useful when a slurry in accordance with a conventional wet process is incorporated as a portion of the feed material.

BRIEF DESCRIPTION OF THE DRAWINGS

FIG. 3 is a partial schematic illustration of a typical sampler and analyzer and control means in accordance with this invention.

DESCRIPTION OF PREFERRED EMBODIMENTS

Figure 1:
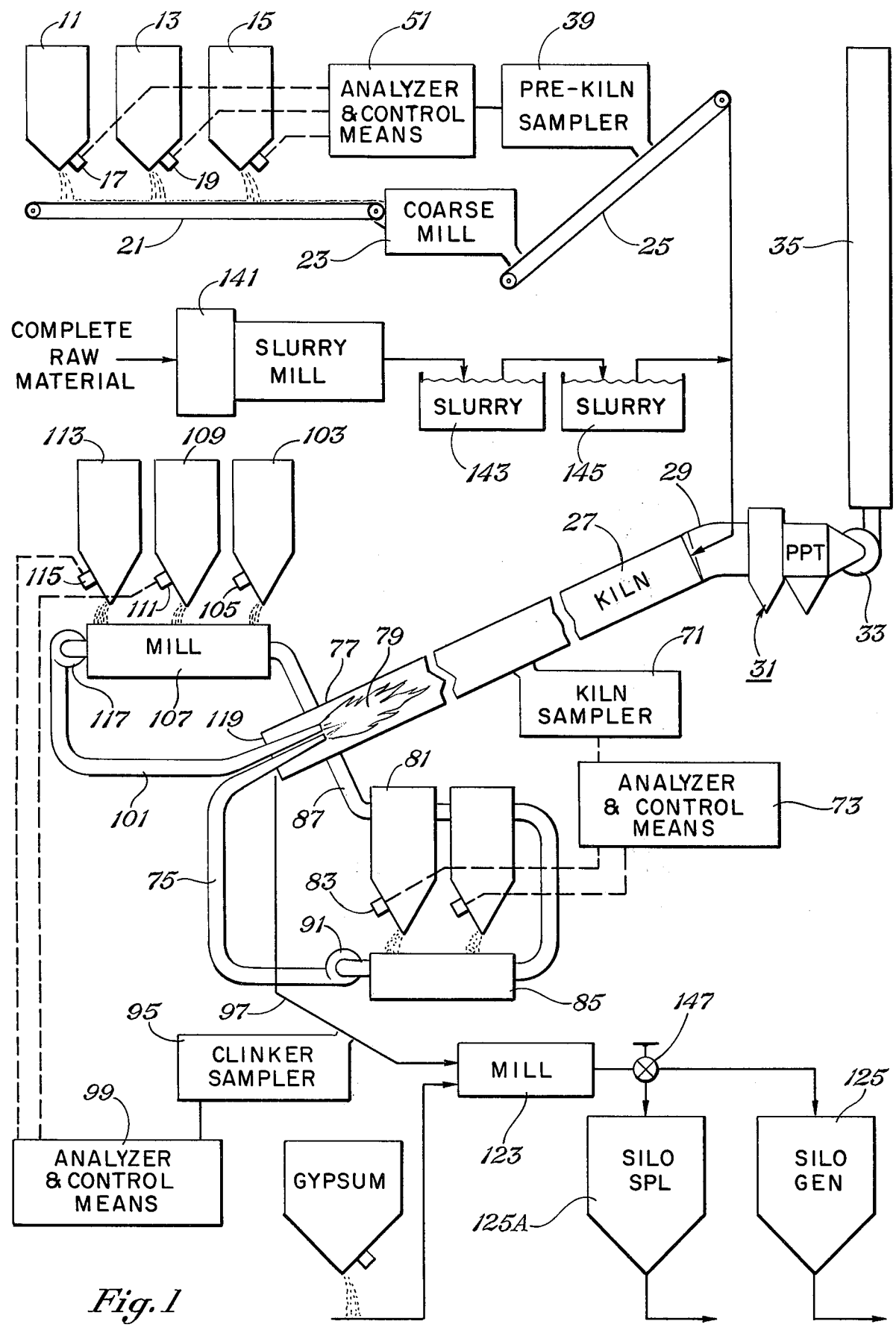
FIG. 1 is a schematic illustration showing apparatus and method of this invention for manufacturing cement.

The descriptive matter hereinafter is given with respect to a conventional cement plant for making cement clinker and employing a rotary kiln having high temperature combustion zone in which fuel is burned.

As employed herein, the term "kiln system", is inclusive of conveyors; raw materials feeding system; the dust collection system; the kiln, per se; the firing system; and the clinker cooler system. Ordinarily, the respective ingredients are fed into the feed end of the kiln. As employed herein the term "feed end" is defined as the part of the kiln upstream of the combustion zone into which the ingredients are fed, whether or not it be at the uppermost end of the kiln. Sometimes, for example, it is advantageous to introduce one or more ingredients, or mixtures thereof, at a point other than the uppermost end of the kiln.

As is well know, a general purpose cement clinker may have a typical composition such as set out in Table I.

Table I

| GENERAL PURPOSE CLINKER | |
|---|---|
| Chemical Composition | Percent* |
| CaO | 67 |
| $SiO_2$ | 22 |
| $Al_2O_3$ | 6 |
| $Fe_2O_3$ | 3 |
| $K_2O$, $Na_2O$ and MgO | 2 |

*percents herein are percents by weight unless otherwise indicated

The potential mineralogical compound compositions have been delineated in issued patents, such as U.S. Pat. No. 3,437,329, the descriptive matter of which is incorporated herein by reference for details that are omitted herefrom.

Table II hereinafter delineates a typical mineralogical compound make up of a general purpose clinker, excluding magnesium oxide and alkali compounds.

Table II

| Mineralogical Compound | Percent |
|---|---|
| $C_3S$ | 61.7 |
| $C_2S$ | 16.7 |
| $C_3A$ | 10.3 |
| $C_4AF$ | 7.6 |

In Table II and as is employed elsewhere herein, the conventional abbreviations are employed as follows:
C = CaO
S = $SiO_2$
A = $Al_2O_3$
F = $Fe_2O_3$.

Also as recognized, the portion of di and tricalcium silicates, calcium aluminates and the like have to be controlled within a narrow chemical range to obtain a satisfactory cement. The cement clinker is susceptible to contamination by magnesium oxide or the like that may form periclase or other materials that are slow to hydrate and that impart undesirable properties to a setting cement. These chemicals, mineralogical compounds and their controls are delineated in numerous well known texts and publications that are incorporated herein by reference for conventional details omitted herefrom. Typical of such conventional information that is incorporated herein by reference are those listed in Table III.

TABLE III

KIRK-OTHMER ENCYCLOPEDIA OF CHEMICAL TECHNOLOGY, Second edition, Anthony Standen, editor, Interscience Publishers, New York, 1969, volume on cements, pages 684–710.

BOOKS

THE CHEMISTRY OF CEMENT AND CONCRETE, Third edition, F. M. Lea, KT, C.B., C.B.E. D.SC., F.R.I.C., Formerly Director of Building Research, Chemical Publishing Co., Inc., New York, N.Y., First American Edition 1971, pages 134–135.

PROCEEDINGS OF THE THIRD INTERNATIONAL SYMPOSIUM ON THE CHEMISTRY OF CEMENT, London 1952, Held under the auspices of the Building Research Station of the Department of Scientific and Industrial Research and the Cement and Concrete Association, Published by the Cement and Concrete Association, 52 Grosvenor Gardens, London SW1, Chapter 20, "The influence of the fineness of cement raw mixes on their burnability", T. Heilmann, pages 711–749.

CHEMISTRY OF CEMENT, Proceedings of the Fourth International Symposium Washington 1960, Volume I, Symposium held Oct. 2–7, 1960 at the National Bureau of Standards, Washingtion 25, D.C., proceedings published in two volumes, National Bureau of Standards Monograph 43 — Volume I, Issued Aug. 31, 1962, Paper II-S4. "Reactions of Coal Ash With Portland Cement Clinker During the Burning Process", T. Heilmann, pages 87–106.

Proceedings of the Fifth International Symposium on the Chemistry of Cement, Tokyo, 1968,PART I CHEMISTRY OF CEMENT CLINKER (Volume I), Symposium held Oct. 7–11, 1968 at the Tokyo Metropolitan Festival Hall, Tokyo, Proceedings published in 4 volumes Dec. 31, 1969, "On Kinetics of Cement Clinker Sintering", page 112 and "On Kinetics of Crystallization of Clinker Liquid Phase", page 113.

MAGAZINES

ROCK PRODUCTS, CEMENT TODAY — A special section of May 1974 ROCK PRODUCTS, "Wet or dry process kiln for your new installation?", Henning R. Norbom, pages 92–100, May 1974.

ROCK PRODUCTS, "Blending of raw mix for cement manufacture, Part 2", J. B. Wilson & W. C. Durie, pages 60–62 and 68, April 1974, a Maclean-Hunter publication, Vol. 77, No. 4.

PIT & QUARRY, CEMENT INDUSTRY REPORTS, 105 West Adams Street, Chicago, Ill. 60603, "Roller mills have found a role", Raymond J. Krekel and Stanley L. Stiles, pages 93–98 and "Utilization of waste heat from dry-process rotary kilns", Dr. P. Weber, Polysius Corp., pages 115–122 and "Medusa's Georgia plant undergoes major changes — New preheater kiln, roller and raw mill system at heart of expansion and conversion to dry process", B. C. "Sandy" Herod, pages 141–146, July 1974.

In most parts of the world the constituents, or ingredients, of the cement clinker composition have to be admixed, or blended, before being fired in the kiln to obtain a satisfactory final cement clinker. Ordinarily, the calcareous components and the argillaceous components are fed into the feed end of the kiln and formed into cement clinker during their 2½ to 4½ hour traverse longitudinally of the rotating kiln, encountering temperatures of up to 2,600° F–2,800° F (1,426°–1,538° C). In many parts of the world, however, the limestones, marls and the like that include the calcareous component also include sufficient proportions of the argillaceous material, such as the aluminum oxide, iron oxide and the like, that only siliceous materials need be added. Typical of such deposits are those around Artesia, Mississippi, where the limestone source is close to the natural cement rock so that only the silica need be added. Consequently, this invention will be described with respect to this type of installation. It is to be realized, however, that the siliceous material is used herein as synonymous with the argillaceous material where the siliceous material may incorporate aluminum oxides, or other materials normally thought to be in the argillaceous portion of the raw feed mix for making cement.

The prior art has recognized that at least the variables of the temperature, residence time, size of the particles and intimacy of contact between the particles must be carfully controlled during the traverse of the kiln to obtain the desired satisfactory cement at the discharge end of the kiln.

This invention may be understood by reference to the FIG. 1, which schematically illustrates a typical process of this invention. For simplicity, the wet process portion will be omitted from the descriptive matter immediately hereinafter and will be described later in another embodiment. As indicated hereinbefore, the cement manufacturing plants may have a plurality of sources of a plurality of ingredients in pure form. This is unusual, however, and ordinarily, there will be employed mixtures, each of which contain a plurality of the respective ingredients and it is toward this type of cement plant that the following discussion is directed.

Referring to FIG. 1, there is illustrated a first source 11 of a first mixture that includes the calcareous material and a second source 13 of a second mixture that includes the argillaceous or siliceous material. Any additional sources, such as hopper 15, may be employed for any additional components desired. The at least first and second mixtures from the respective first and second sources 11 and 13 are admixed together at respective first and second rates by first and second proportioning feeders 17 and 19 and fed onto conveyor belt 21. The first and second rates are in respective predetermined quantities per unit time so as to form a balanced cement clinker mix for use in making the cement.

The resulting admixture on the conveyor 21 is fed to a coarse grinding means, such as the coarse mill 23. The coarse mill 23 is one of the rotary mills, such as the disc mills, the cage mills, or the muller mills that can handle and grind the respective mixtures without any preliminary drying thereof. Of these mills, a cage mill, such as the Stedman mill, available from Stedman Foundry and Machine, Aurora, Ind., 47001 has been found particularly preferable.

In a conventional plant the crushing and grinding apparatus, or comminution means, may include a primary crusher, a secondary crusher with the respective vibrating screens, hoppers, transport belts, storage facilities and the like for obtaining the desired particle sizes. Any required blending of additional materials necessary to obtain a desired cement composition, is done via suitable bins and proportioners and the materials are conventionally finely ground in grinding mills, such as ball mills before being sent to silos, as by suitable conveyors.

In accordance with this invention, however, the entire fine grinding section may be dispensed with, since the first and second mixtures may include coarsely ground material. For example, the first mixture may include particle sizes up to three-eighth inch or so in lateral dimensions; and the second mixture may include particle sizes up to one-fourth inch or so in lateral dimensions. Those skilled in the art will appreciate the commercial significance of such savings.

From the coarse mill 23, the coarsely ground raw material is continuously fed, as by conveyor 25, to the kiln 27.

The kiln 27 is a conventional item, normally several hundred feet in length; formed from steel plates and lined internally with fire brick or the like. A kiln is rotatably mounted such that it can be rotated about its central longitudinal axis by suitable drive mechanisms and rides on steel tires. Such drive mechanisms and the like are conventional, as is the kiln.

The raw mixture is fed into the feed end 29 of the kiln 27. Under the force of gravity, the material traverses longitudinally downwardly through the inclined kiln as the kiln is rotated. Suitable heat exchangers and the like may be employed to provide the desired increase in efficiency of the heating of the materials and prevent requiring undesirably long kilns to obtain satisfactory drying and reaction residence times.

The feed end 29 of the kiln 27 is connected with suitable dust collection equipment, such as electrostatic precipitators, PPT, dust bins 31 and the like for removing the dust before the gases are pulled on through by suitable fans 33 and exhausted through smoke stack 35. The removal of the dust and exhausting of the gaseous components is also conventional, as is the apparatus for doing so. Consequently, this application need not describe in detail such conventional apparatus.

A pre-kiln sampler 39 is disposed adjacent the conveyor 25 at a pre-kiln location upstream of the feed end 29 of the kiln 27. The pre-kiln sampler 39 serves as a means for sampling the first and second mixtures being conveyed toward the feed end of the kiln. The pre-kiln sampler 39 may comprise any of the commercially available sampling apparatus. The more elaborate samplers give better results and are preferred in this invention. For example, samplers are available commercially that will sample after each small time interval and prepare a composite sample for analysis after a longer time interval. As illustrated in FIG. 3, the pre-kiln sampler preferably includes both the sampling apparatus 41 and blending mill 43.

The sampling apparatus 41 may be any of the conventional types. Ordinarily, a small bucket arm type sampler is employed that will cut across the belt to obtain the desired samples.

The blending mill 43 may be any of the conventional small mills employed for blending samples. Ordinarily, ball mills will be employed, since they are trouble-free and long lasting.

As a specific example, the sampling apparatus will make a cut across the conveyor belt each 15 seconds, obtaining an average mixture of the first and second mixtures. The resulting collected samples are conveyed by suitable sample conveyor 45 to the blending mill 43. In the blending mill 43, there is an integration of all of the samples collected such that a composite sample is provided at the end of a predetermined time interval; for example, 15 minutes. The remainder of the samples may be passed out excess sample conveyor 47; for example, back onto the conveyor belt 25 for being fed into the kiln 27. The desired composite sample is conveyed by sample conveyor means 49 to a means for analyzing rapidly the respective samples collected at the pre-kiln location. Expressed otherwise, the pre-kiln sampler 39 is connected with an analyzer control means 51, FIG. 1. As can be seen in FIG. 3, the analyzer and control means 51 preferably includes a rapid analysis means, such as x-ray analyzer 53; that is connected with a computer 55; that, in turn, is connected with a controller 57.

The x-ray analyzer 53 is connected with the output of the blending mill 43, as by sample conveyor means 49. If desired, a conventional laboratory x-ray analyzer 53, or equivalent, may be employed and the samples collected manually and taken to the analyzer. For good, practical control in the on line process of this invention, however, an automated interconnection is preferred.

The x-ray analyzer 53 is electrically connected, as by electrical cable 59 with the computer 55. The computer 55 has stored in its memory a predetermined analysis, indicated by the arrow 61. The predetermined analysis is determined back from the ideal, or most nearly optimum, cement clinker analysis for the type of cement to be produced. By "back from" is meant that the predetermined analysis will include corrections for ash and the like if coal is being burned; and it will include corrections for partial or complete return of dust collector catch if it is being returned to the kiln, as well as any other predetermined condition for which a correction is necessary. Out of the comparison, there will be defined a deficiency of ingredients with respect to the balanced portland cement clinker that is desired.

The computer 55 is connected with controller 57 by electrical cable 63 such that the signal from the computer will effect a desired re-proportioning of the first and second mixtures by the controller 57. Specifically, a digital correction signal will be sent over the cable 63 to the controller 57. The controller 57 will, in turn, translate the digital correction signal into correction signals to the respective feeders 17, 19 and the like on sources and bins 11, 13 and 15. Specifically, the controller 57 is connected with the proportional feeder 17 on the first source 11 of the first mixture by electrical conduit 65; with the proportional feeder 19 on the second source 13 of the second mixture via electrical conduit 67; and with any other proportioning feeders, such as that on hopper 15. Accordingly, the proportioning feeders are adjusted to obtain a new proportion of the respective mixtures fed onto the conveyor belt 21, as by cross conveyor 69.

Thus, the proportioning feeders interconnected with the controller 57 serve as a means for adjusting the proportions of the first and second mixtures to correct the deficiency found from the sampling of the mixtures being fed to the feed end of the kiln.

The pre-kiln sampler alone provides control analogous to the prior art batch-type control, although the on line control obviates a lot of expensive equipment required in the prior art.

In any event, after the materials are fed into the kiln, they traverse downwardly along the rotating kiln, encountering the hot gases coming up the kiln. The materials are admixed; are dried; and are reacted. The smaller particle sizes react early in the kiln. The total time of traversal through the kiln might be as great as about 4 hours, or more.

To improve the control over the specifications of the cement clinker, there is provided another means for sampling materials in the kiln at a predetermined point downstream from the feed end. This is shown as kiln sampler 71, FIG. 1. The kiln sampler 71 comprises the sampling apparatus and blending mills, such as illustrated in FIG. 3. Ordinarily, the sampling apparatus may be merely a collection tray adjacent holes in the side of the kiln for sampling as the kiln rotates, rather than a means for cutting across a conveyor belt as described hereinbefore. Respective samples are ground to suitable fineness in the blending mill in the kiln sampler.

As described hereinbefore with respect to the pre-kiln sampler 39, an analyzer and control means 73 is connected with the kiln sampler 71 for analyzing rapidly the respective samples collected at the downstream point along the kiln. The point of sampling at the downstream point may be some point; such as, from 1 to 3 hours normal traverse of the materials; upstream of the discharge end of the kiln.

As described with respect to FIG. 3, the analyzer and control means comprise the x-ray analyzer connected with the computer having a predetermined analysis input. The computer compares the analysis of the respective samples with the predetermined analysis and sends digital correction signals via a cable to a controller, such as controller 57 illustrated in FIG. 3. This allows the controller to adjust a means for introducing into the combustion zone of the kiln at a third rate of a third mixture to supply the deficiency of ingredients as determined from the analyses of the samples at the predetermined point downstream from the feed end of the kiln 27.

Specifically, at the discharge end of the kiln, a suitable pipe 75 is provided for blowing in a third mixture to make up the deficiency signalled by the analyzer and control means 73. The pipe introduces the third mixture into the combustion zone 77, containing illustrated flame 79, of the kiln 27.

One or more bins 81 will serve as the source of the third mixture. The third mixture will be fed at a third rate by a proportioner, or proportioning feeder, 83 into an air pick up trap 85. Hot gases from the kiln will be sucked through the pick up trap 85 by way of conduit 87 and fan 91. The third mixture may be the same as the second mixture; for example, may comprise straight run quarry sand. Ordinarily, it is preferable that the sizes of the particles in the third mixture not exceed one eighth inch in lateral dimensions, since they have less than one-half the residence time in the kiln in which to react with the excess of the calcareous material in the first mixture. The fans that are commercially available for employment as fan 91, have specially coated and hardened blades to resist erosion by the third mixture entrained in the air stream being blown into the combustion zone of the kiln.

If desired, of course, the third mixture may comprise a plurality of relatively purer ingredients that are admixed by respective proportioning feeders and illustrated in the drawings as a second bin and proportioning feeder. Such additional bins will not be necessary, however, in the embodiment in which the third mixture comprises the siliceous or argillaceous mixture, like the second mixture, that is complementary with the first mixture containing calcareous material.

In any event, the respective proportioning feeders are connected via suitable control boxes with the analyzer and control means 73, as delineated hereinbefore with respect to FIG. 3; so that the third rate may be increased or decreased as necessary to maintain the proper balance of ingredients in the kiln and form the desired balanced cement clinker.

The third mixture may comprise either a coarsely ground mixture alone, a finely ground mixture alone, or a combination of coarsely ground and finely ground mixture.

The finely ground mixture may be reacted more rapidly in the combustion zone; and, hence, is employed for rapid, exceptionally high degree of control, as in response to analyses of the cement clinker formed and discharged from the discharge end of the kiln.

The finely ground third mixture may be thought of as a fourth mixture in the sense that it may be the same as or different from either the second or the third mixtures in order to compensate for deficiencies found in the finely ground clinker that is being discharged from the kiln 27. In either case, the third mixture will be complementary to the first mixture and the calcareous material it contains, similarly as described hereinbefore with respect to the second mixture.

The finely ground third mixture, or fourth mixture, is advantageously intimately admixed with a particulate fuel when such is being burned in the combustion zone. As described in our co-pending application referenced hereinbefore, the intimately admixed particulate fuel and the finely ground third mixture, such as silica, produces a hotter flame effecting more nearly complete combustion of the fuel rapidly, producing a brighter flame while simultaneously creating a third mixture that reacts rapidly with the other materials in the kiln so as to correct almost immediately any deficiency detected in the final cement clinker being produced. To effect this result, there is provided a clinker sampler 95 for sampling the final cement clinker flowing out the clinker cooling system 97 (the respective cooling means not being shown). As described hereinbefore, the clinker sampler 95 includes the sampling apparatus, per se, for pulling respective samples of clinker; and the blending mill 43 for preparing a composite sample for analysis. Specifically, the clinker sampler will have a sampling apparatus 41 that is appropriate to the point at which the clinker is sampled. For example, the same type sampler described hereinbefore with respect to the first and second mixtures at the pre-kiln location may be employed to sample the clinker on open conveyor systems, such as conveyor belts. If desired, of course, the sampler may be employed in the respective roller mills or at other points currently employed for sampling.

The clinker sampler 95 is connected to analyzer and control means 99. The analyzer and control means 99 includes, as described with respect to FIG. 3, an x-ray analyzer, a computer, and a controller that operates as described hereinbefore. In the computer for the clinker, however, the predetermined analysis may be exactly the same as the analysis of the desired cement clinker, since there is no need for corrections; as to compensate for ash deposited by a particulate fuel or other corrections; that may be appropriate to the predetermined analyses set into the computer as described hereinbefore with respect to the pre-kiln sampler 39 or the kiln sampler 71.

The controller is connected to a means for introducing into the combustion zone of the kiln at a fourth rate a fourth mixture, or finely ground third mixture, to correct the deficiency. By finely ground is meant of a size −100 mesh. Specifically, at the discharge end of the kiln, a suitable pipe 101 is provided for blowing a mixture of air, fuel and a fourth mixture into the combustion zone, or chamber, within the kiln.

As illustrated, the particulate fuel, or coal, is fed into bin 103 and thence in a predetermined quantity per unit time by a proportioning feeder 105 into the mill 107.

In addition to the coal, a fourth mixture, or finely ground third mixture, including at least one of the argillaceous and the siliceous material and chosen so as to be complementary to the unreacted first mixture, is fed via bin 109 and proportioning feeder 111 to mill 107. The proportioning feeder 111 is provided to control the rate at which the fourth mixture from the bin 109 is fed into the combustion zone in intimate admixture with the particulate fuel. In the embodiment being described, only silica is required to complement the first mixture material that may be unreacted with the second mixture also being fed into the open end of the kiln 27, so only one bin 109 is required. Another one or more bins 113 with respective one or more proportioning feeders 115 may be employed for one or more ingredients in addition to the fourth mixture, as for making special purpose cements (which will be described later hereinafter).

In any event, the fourth mixture, when any is employed, and the coal from the bins 103 and 109 are ground by mill 107 to suitable fineness and discharged through an air separator, or similar particle size determinator, to the burner pipe 101 of the kiln. A blower 117 is used to suck hot air from the kiln, and through the mill 107 as an intermediate air carrier for the powdered fuel and finely ground fourth mixture to be blown through the pipe into the combustion zone 77. If desired, the fourth mixture and the coal may be pre-ground separately as long as they are intimately admixed sufficiently to achieve the delineated results.

Preferably, the fourth mixture is finely ground and is of a size −100 mesh, or passing through a 100 mesh, U.S. standard seive rating. The fourth rate of the fourth mixture is that required to supply the deficiency determined by the analyzer. The control means are connected respectively with the proportioning feeders 111 and 115 on the bins 109 and 113 in order to supply the deficiency noted in the clinker being analyzed. The deficiency is supplied rapidly because of the rapid reactivity of the finely ground fourth mixture, particularly when intimately admixed with the coal. Specifically, finely ground fourth mixture achieves a state of enhanced activity that reacts with the excess first mixture and corrects the deficiency almost immediately, so there is very little sub-standard clinker produced.

Surprisingly, when the coal is admixed with the finely ground fourth mixture, the flame 79 is of enhanced brightness and heat emission. In fact, when the admixing is so intimate as to substantially surround the coal particles with particles of the fourth mixture, such as silica, the best results are achieved.

In any event, the burning of the fuel produces a temperature in the burning zone in the approximate range of 2,600°–2,800° F, as indicated hereinbefore.

During the traverse downwardly through the kiln, the first and second mixtures, including the calcareous and argillaceous and siliceous material loose moisture and ultimately reach the indicated temperatures so as to interact with each other. The coarsely ground third mixture that is added to provide desired cement clinker, is large enough in size that it needs the longer time to react with the excess calcareous material in the first mixture, consequently, it is added so as to have the residence time of an hour or more. On the other hand, the finely ground third mixture, or fourth mixture, reacts rapidly and fuses into the heated first mixture including the calcareous material. While this invention is not to be limited to the consequences of any theory, it is theorized that the forth mixture material; for example, finely ground siliceous material; attains a molten state such that the interaction of the calcareous material is a liquid diffusion reaction at high temperatures; and, consequently, is much more rapid than the usual solid state diffusion reaction. In any event, there is a reaction to a satisfactory cement clinker even though the two components traverse longitudinally along the kiln for a much shorter distance and time than in a conventional process.

The final cement clinker is continuously discharged from the discharge end 119 of the kiln 27. The clinker is conveyed to a suitable cement mill 123. Gypsum is also fed to the cement mill 123. Gypsum is used broadly to embrace all mineral forms of calcium sulfate, including anhydrite. The gypsum and clinker are admixed in predetermined proportions and pulverized. The resultant fine cement powder is conveyed to the appropriate cement silos 125. Ordinarily, one of the silos, such as 125A, may be employed for special purpose cement and the remainder employed for the general purpose cements. The respective cements are removed from storage as needed for shipment in bulk, or packaging and shipment in the smaller bags or the like.

A variety of methods for making general and special purpose cements are described in several publications; for example, in the aforementioned U.S. Pat. Nos. 3,437,329; 2,871,113; 1,916,761; and 864,068. Methods of making cement are also described in British Pat. Nos. 28,970 and 1,438 and in published articles, such as: Carlsen — ROCK PRODUCTS, 61, No. 5, 87–88 (1966) and McLarmour et al — ROCK PRODUCTS, page 59, July 1943.

As a result of this invention, a satisfactory clinker for whatever type cement is desired is produced. Table IV illustrates a typical composition of general purpose cement produced in accordance with this invention.

Table IV

| Composition | Percent |
| --- | --- |
| $SiO_2$ | 22.3 |
| $Al_2O_3$ | 5.6 |
| $Fe_2O_3$ | 2.9 |
| CaO | 66.3 |
| MgO | 0.9 |
| $SO_3$ | 0.19 |
| $Na_2O$ | 0.2 |
| $K_2O$ | 0.3 |
| Free CaO, insolubles | 1.31 |
| $C_3S$ | 59.1 |
| $C_2S$ | 20.8 |
| $C_3A$ | 9.2 |
| $C_4AF$ | 8.6 |
| $CaSO_4$ | 0.3 |

Apparatus is commercially available that is capable of grinding quarry moisture material. Suitable apparatus includes a disc mill, cage mill, muller mill, hammer mill or any other grinder designed for size reduction of moisture-containing material.

The control process is an on line process in which the materials will have already passed the point at which the sampling is made, so the analysis techniques and the corrections are critical. This invention represents a major improvement over the old batch processes in which the ingredients were either blended and stored in silos if dry, or formed into a slurry and stored in slurry tanks. In the old methods, the batches were worked with materials added until exactly the right composition was achieved before being fed to the kiln.. In the current process involving on line controls, the corrections have to be made in staged succession in order to compensate for errors detected at a sampling point in the system.

The straightforward approach is where any one of as many as 40 ingredients are analyzed for and corrected for by the computer portion of the analysis and control means. On the other hand, it is a simpler process to design the control process for a particular plant employing the mixtures that are indigenous to the region in which the plant is located and which form the normal feed streams for the plant. One such method that facilitates control is to use the well known correlation for the lime saturation factor (L.S.F.) plotted against the ratio of silica ($SiO_2$) to $R_2O_3$. The $R_2O_3$, as is well known, is the aluminum oxide plus ferric oxide ($Al_2O_3$ plus $Fe_2O_3$).

Figure 2:
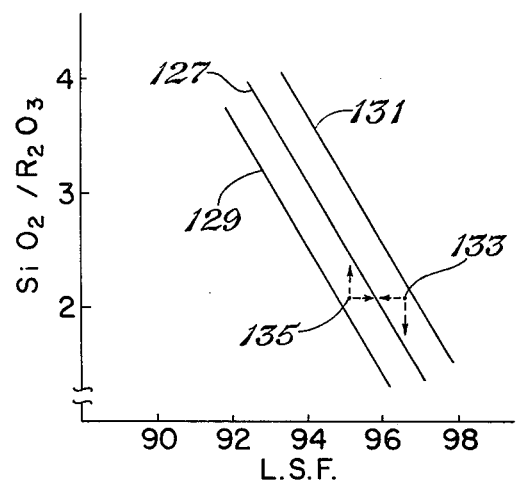
FIG. 2 is a typical graph of mixture proportions that facilitate control in the respective embodiments of this invention.

Referring to FIG. 2, the control line is indicated by 127 with the limit lines 129 and 131 on either side defining control limits. For example, if the analysis shows, when plotted on FIG. 2, that the control point is, for example, at 133, this indicates that there is too much lime present in the system so the relative proportion is decreased, as by increasing the siliceous or argillaceous material in the respective second, third or fourth mixtures, depending upon the sampling point. Conversely, if the sampling point falls at point 135, this indicates that there is too little lime present. Consequently, the amount of the respective mixtures containing the siliceous and argillaceous material is decreased by decreasing the respective rates of the respective mixtures, depending upon the sampling point for which the assumption was made. The new proportions are readily calculated by the computer through merely furatively drawing an intersect on the line at the place where it is desired to be. The process is a simple linear regression analysis.

This invention is very flexible. It can be combined with existing wet processes to produce significant advantages, as will become apparent from the descriptive matter hereinafter; yet achieve exceptionally fine on line control. It is also useful in making special purpose cements, as described in more detail even later hereinafter.

COMBINATION WET AND DRY PROCESS

One embodiment of this invention that appears commercially significant in the future is a combination wet and dry process employing the advantages of both, while eliminating the disadvantages of each. In this process, the dry raw materials comprising the delineated first and second mixtures are fed to the feed end 29 of the kiln 27 as delineated hereinbefore, although in reduced quantities, since it is admixed with a predetermined proportion of conventional slurry. Referring to the FIG. 1, the complete raw material containing both the calcareous and the siliceous, or argillaceous, materials necessary for forming a predetermined cement clinker are comminuted to the desired size for forming the slurry. As delineated hereinbefore, the complete raw material for the slurry is reduced to the desired fineness by feeding through suitable crushers, grinders and mills. For example, the calcareous material may be fed through primary and secondary crushers. Similarly, the siliceous material may be fed through suitable crushing and grinding apparatus to obtain a size appropriate to the final grinding mill. The calcareous and siliceous material are then admixed in suitable proportions and fed to the slurry mill 141. The effluent from the slurry mill may be passed through a vibrating screen or any other type of separator such that only the fines are fed to the slurry tank and the oversize return to the inlet of the slurry mill in accordance with conventional practice. When admixed with water, the materials then form the slurry which is fed to the large slurry storage tank 143. The slurry is ordinarily agitated to maintain a substantially uniform mixture. The slurry is tested and additives can be further blended, if necessary, and fed to a final storage basin 145. The final blended slurry is also agitated to maintain a substantially uniform mixture. The final blended slurry from the storage basin 145 is then continuously fed at a desired rate to the inlet end 29 of the kiln 27. The slurry is admixed with the dry, coarsely ground first and second mixtures also being fed into the open end of the kiln at their respective rates. The dry admixture of the first and second mixtures reduces the present moisture of the total mixture. As the mixture of slurry and dry admixture traverses downwardly through kiln 15, it is dried by evaporation of the water. The calcareous material chemically reacts with the other ingredients that traverse concurrently therewith to form the cement clinker that is continuously discharged from the discharge end 51 of the kiln.

As the materials are sampled at the pre-kiln sample location, at the kiln sample location, and at clinker sample location, corrections are made by altering the proportions of the respective mixtures, as by increasing or decreasing the respective mixture containing the siliceous or argillaceous material so as to react properly with the calcareous material in the first mixture. The on line control primarily corrects the dry material, although the latter two sampling, analyzing and controlling operations also correct for any inaccuracies in the slurry. This latter is ordinarily minimal, since the batch slurry process can have its correction made before it is fed into the kiln. Respective sampling, analyzing and controlling are carried out as described hereinbefore.

Specifically, the pre-kiln sampling, analyzing and adjusting proportions of the first and second mixtures are carried out as described with respect to FIGS. 1 and 3 hereinbefore. Ordinarily, the proportions may be adjusted to have a slight deficiency of the second mixture, or siliceous or argillaceous material, if it is the one being added in the third and fourth mixtures. If, when analyzed, additional siliceous material is required, it is injected either by a pipe 75 or pipe 101, or both, to react with the remainder of the calcareous material. If the finely ground siliceous material, for example, is fed through pipe 101, it is rendered chemically active such that it can satisfactorily combine with the larger calcareous raw material rapidly to correct deficiencies detected in the cement clinker.

In any event, the final clinker passes out the discharge end 119 of the kiln 27 and is treated as described hereinbefore.

If desired, additives may be incorporated into the feed end with the respective materials. If such additives are incorporated into the feed end with the respective materials they may be ground to the required size for producing quality cement clinker, either in accordance with this invention or in accordance with conventional cement production technology.

Unless otherwise specified, the proportions of the kiln feed slurry and the coarsely ground first and second mixtures, or dry materials, in an admixture of the same fed into the kiln are defined in terms of parts by weight of absolutely dry, or moisture-free, materials. For example, a 50–50 admixture defines an admixture in which the slurry is present in an amount sufficient to afford as much dry material by weight as is afforded by the admixed coarsely ground dry materials; or 50 percent by weight. This attains relative uniformity, as compared to defining by raw slurry — dry material ratios.

Employing an admixture of kiln feed slurry and the coarsely ground, quarry quality dry materials has multiple advantages. One advantage is that quarry quality dry raw materials can be coarsely ground and employed without requiring supplemental operations, such as reducing moisture content. Another advantage is that conventional plants can be converted to this invention without requiring increasing the capacity of the coal mills 107. In the event that there is still some excess capacity of a given coal mill 107, a lower proportion of slurry may be employed in the admixture and more third and fourth mixtures fed into the combustion zone, as desired. Further, conventional wet milling practice does not allow the water level of the slurry to drop below a certain percentage due to resulting milling and pumping difficulties. The admixture of slurry and coarsely ground respective materials can be fed to the kiln at a total moisture content much less than has been possible heretofore with conventional wet milling practice. Proportions of as little as 40 percent, based on weight of dry materials, of slurry have been satisfactorily burned to final cement clinker.

If desired, the slurry may employ less than the complete raw material and the added ingredient made up by being supplied from the other bins through either pipe 75 or pipe 101.

Preliminary tests have also indicated that various additives may be incorporated with the mixtures into the combustion zone, similarly as described hereinafter with respect to manufacturing special purpose, or special, cements.

PROCESS FOR MANUFACTURING SPECIAL CEMENTS

This invention is also advantageous in manufacturing special cements and embodies an improvement on the method disclosed in U.S. Pat. No. 3,437,329. For example, one of the special cements is referred to as a Type II, defined by ASTM C-150. The Type II cement has a high silica, high iron and low alumina content. It is employed where sulfate salts may be present to deteriorate ordinary general purpose cement. It may be employed also where moderate heats of hydration are necessary, as in large dams or the like.

Table V gives a typical formulation of a Type II cement.

Table V

| Composition | Percent |
|---|---|
| $SiO_2$ | 22.3 |
| $Al_2O_3$ | 4.7 |
| $Fe_2O_3$ | 4.3 |
| $CaO$ | 63.1 |
| $MgO$ | 2.5 |
| $SO_3$ | 1.7 |
| Free CaO, insolubles | 1.4 |
| $C_3S$ | 44.0 |

Table V-continued

| Composition | Percent |
| --- | --- |
| $C_2S$ | 31.0 |
| $C_3A$ | 5.0 |
| $C_4AF$ | 13.0 |

Another special type of cement is referred to as Type III. The Type III cement is a high early strength cement, or quick hardening cement. Table VI gives a typical composition of such a Type III cement.

Table VI

| Composition | Percent |
| --- | --- |
| $SiO_2$ | 20.7 |
| $Al_2O_3$ | 5.3 |
| $Fe_2O_3$ | 2.7 |
| $CaO$ | 65.3 |
| $MgO$ | 1.3 |
| $SO_3$ | 2.9 |
| Free CaO, insolubles | 1.8 |
| $C_3S$ | 61.2 |
| $C_2S$ | 17.0 |
| $C_3A$ | 9.5 |
| $C_4AF$ | 9.2 |

From Tables V and VI it can be seen that the proportions of the components of the special cements are different from the general purpose cement. In the prior art, there has been an inordinately long time required to change over, since a slurry tank had to be set aside for the special slurry for the special cement. With the dry process, a separate silo had to be set aside for admixing the ingredients. Moreover, a long swing over time was required to change the kiln to produce special cement. During the swing over, cement was produced that could not be employed except by separate storage and limited, careful later blending. In U.S. Pat. No. 3,437,329, the raw mixture, either wet or dry, was changed only to the extent of adding a predetermined quantity of one or more of the raw materials in dry or powdered form as an additive blown into the flame or burning zone of the kiln. The continuous rotation of the kiln and the swirling flames allegedly mixed the additives thoroughly with the contents of the kiln and caused the resulting chemical reaction to produce the special purpose clinker for use in the special purpose cement.

This invention performs a surprisingly improved result in obtaining consistently better cement clinker by intergrinding or intimately admixing the additional ingredients with the coal in the coal mill 107 before they are fed into the combustion zone 77.

As will be seen by considering the Tables IV and V, increasing a proportion of a particular ingredient will automatically effect a decrease in the relative proportion of the other ingredients. Those skilled in the manufacture of cements, calculate readily the upward and downward shifting of the proportions of the ingredients to obtain the desired chemical formulation of cement. For example, to form the illustrated Type II special purpose cement, iron oxide and silica may be added to adjust the overall proportions of the chemical compositions as compared with the general purpose cement. By similar analogy, lime and alumina can be added in extra proportions to produce the illustrated Type III special purpose cement. Those skilled in the art consider the size of the kiln and the quantity of the clinker being produced to decide upon the respective quantities per unit time of the respective ingredients to be added. Moreover, referring to FIG. 1, the silica and iron may be added in a predetermined proportion from only the bin 109 or may be added, respectively; the silica being added from bin 109 with the iron oxide being added from the other bin 113. If the lime and alumina are added, the other bin 113 may be employed for their addition, even if the silica is added from the silica bin 109 as described hereinbefore in forming the general purpose cement.

During the time of operation with the special additives being blown into the combustion zone, the special cement clinker being formed is continuously removed and later processed through the cement mill 123 to which the gypsum is added. The resulting special purpose cement is then diverted into a special purpose silo, such as silo 55A. The diversion is indicated schematically by the valve 147.

During the time that the special cement clinker is being formed, the process is uninterrupted. Such a time interval may be for about one day or more. Once the required quantity of special purpose cement is obtained, the special additives are no longer blown into the combustion zone and the process is returned to producing general purpose cement uninterruptedly.

The swing over time required for the kiln to change from producing general purpose to special purpose clinker is materially shortened by this invention. For example, as little as two hours or so may be necessary so there is very little wastage of clinker, particularly when compared with the prior art processes.

This invention will be more clearly understood by reference to the following Example. Screens are U.S. standard designation.

EXAMPLE

Actual manufacturing runs preparing cement clinker were conducted utilizing two different conventional rotary cement kiln plants designed for manufacturing cement by the wet process.

At the beginning of the respective runs, the plants were manufacturing normal portland cement. Under normal operating conditions, the cement clinker was prepared by the wet process employing a cement slurry. The energy requirements averaged about 1.2 million British Thermal Units (BTU's) per barrel of cement. Moreover, a full complement of crushing and grinding, recycling and regrinding and ball milling had to be performed on all of the ingredients. In conventional operation, all of the material that was fed into the kiln was comminuted to sufficient fineness to pass 100 percent through a 50 mesh screen and about 94 percent passing through a 200 mesh screen.

Preparatory to running the test, residence time was determined empirically. In one plant the determination was made by measuring elapsed time for a radioactive material; namely, manganese that had been subjected to radiation from Californium, to traverse between the respective tiers and throughout the full length of the rotary kiln. It was found that about 3½ hours residence time would be provided in the kiln under the conditions of operation during the test, or manufacturing, runs.

The first group of runs were made during the spring. The respective materials, referred to in the tables hereinafter as the slurry, Stedman mill, the 50–50 mixture of the two, sand, and kiln feed were sampled at different times. Table VII represents the particle size distribution, at a Texas plant, in the slurry, in the first mixture from a Stedman mill, in a 50–50 mixture of the two, sand and kiln feed. It is noteworthy that the dry materials were ground satisfactorily even though they contained 14 percent moisture by weight. To grind to prior art sizes would have required drying and a plurality of crushing and comminution operations. The table also shows that the sand was satisfactory as received. In Table VII, the figures represent the percentage passing through the designated sizes. Thus, it can be seen that 97.2% of the slurry particles passed through a 50 mesh screen (−50M) with 84.4% even passing through a 200 mesh screen (−200M). In contrast, the first mixture containing all of the ingredients for the cement except the silica, had particle sizes up to ¼ inch in dimension with only 66.2% passing through a 50 mesh screen and only 47.3% passing through a 100 mesh screen. The prior art teaches that it is increasingly difficult to satisfactorily burn cement clinker with feasible kiln residence time when particle sizes of substantially greater than 50 mesh are present. In many instances, raw materials must be ground very much finer for satisfactory burning.

Table VII

| | PARTICLE SIZE DATA | | | | |
|---|---|---|---|---|---|
| | −4M | −20M | −50M | −100M | −200M |
| Slurry | 100 | 100 | 97.2 | 90.2 | 84.4 |
| Stedman mill* | 98.4 | 85.2 | 66.2 | 47.3 | 10.0 |
| 50–50 mixture | 99.2 | 92.5 | 81.7 | 68.8 | 47.2 |
| Sand | 100 | 94.0 | 72.6 | 10.3 | 0.8 |
| Kiln feed** | 94.2 | 92.6 | 81.2 | 65.9 | 44.8 |

*First mixture
**Based on 95% of 50–50 mixture and 5% sand

Table VIII represents the particle size distribution, at a Mississippi plant, in the slurry, in the first mixture from a Stedman mill, in a 50–50 mixture of the two, sand, and kiln feed. It is noteworthy that the dry materials were ground satisfactorily even though they contained 21.2% moisture by weight.

Table VIII

| | PARTICLE SIZE DATA | | | | |
|---|---|---|---|---|---|
| | −4M | −20M | −50M | −100M | −200M |
| Slurry | 100 | 100 | 100 | 96.8 | 96.3 |
| Stedman mill* | 97.4 | 73.0 | 49.6 | 28.7 | 10.0 |
| 50–50 mixture | 98.7 | 86.5 | 74.8 | 62.8 | 53.2 |
| Sand | 100 | 99.5 | 92.0 | 38.4 | 13.8 |
| Kiln feed** | 98.8 | 87.7 | 76.3 | 60.6 | 49.7 |

*First mixture
**91% of 50–50 mixture of the first mixture and slurry and 9% sand.

Figure 4:
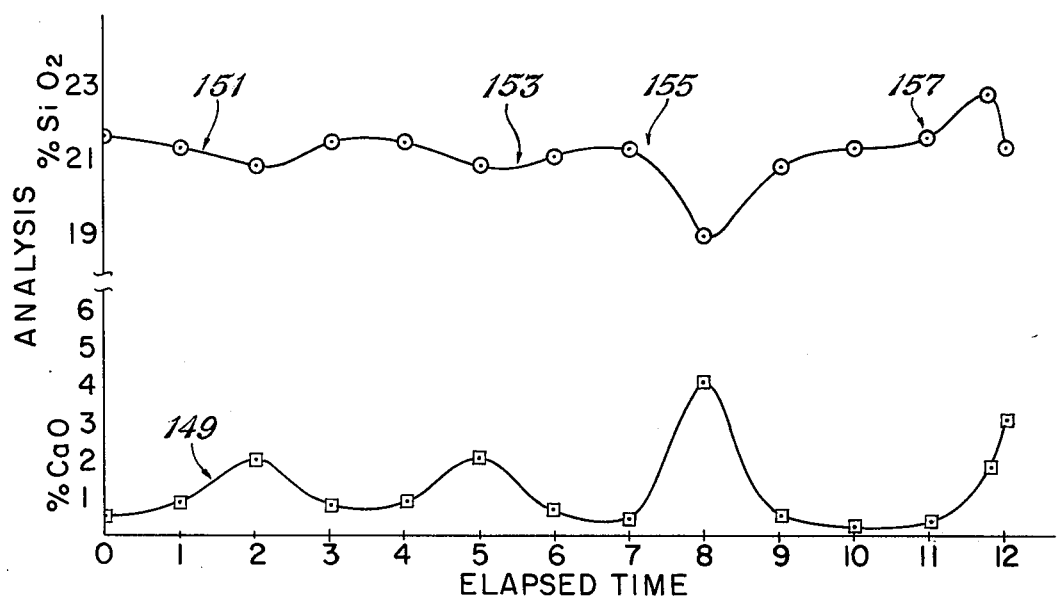
FIG. 4 is a graph showing the change in silica analysis in the cement clinker against elapsed time following a series of events, in accordance with the Example hereinafter.

FIG. 4 depicts an experimental run at the Texas plant to verify whether or not the quarry run sand could be added at either end of the kiln to obtain a reaction. This started at about 8:30 in the morning which represents zero elapsed time on the abscissa, or X-axis, of FIG. 4. The percent free lime (CaO) is illustrated by line 149. The percent SiO$_2$ is illustrated by the line 151. For about the first 5¼ hours, up to point 153, limestone and shale slurry were added at the feed end of the kiln with sand being also added at the free end of the kiln with a gunnite machine, the sand being quarry run sand. The analyses are on cement clinker material. At this point, the sand was shut off, but slurry continued to be fed into the feed end. At about 3:30, an elapsed time of 7 hours, illustrated at point 155, sand was introduced into the discharge end of the kiln. As can be seen, the sand started to decrease after about a 2 hour delay, probably the residence time of the kiln number 4 at the Texas plant. After about another hour, the percent silica in the cement clinker started to increase and continued to increase thereafter. The sand injection in the discharge end of the kiln was decreased at the point 157, or about 11 hours after the run was started. It is noteworthy that the silica continued to increase for about another hour before it returned to about the 22.1% level desired. This demonstrated conclusively that even the coarsely ground third mixture could be introduced into the combustion zone of the kiln and react with the unreacted portion of the first mixture before the clinker was discharged from the discharge end of the kiln.

Computer analyses of the experimental results obtained from the Texas and Mississippi plants indicate that cement having excellent and finely controlled quality and specifications could be manufactured in accordance with the following information, while employing the process of this invention.

Table IX summarizes typical compositions of runs employing the slurry. The delineated compositions are set forth as the slurry, as a loss free composition calculated therefrom and as the final cement clinker, referred to as slurry clinker. Coal was burned during all test runs at the Mississippi plant, while natural gas was burned at the Texas plant.

Table IX

| | MIX COMPOSITION | | |
|---|---|---|---|
| | | Weight Percent | |
| Compound | Slurry | Loss Free | Slurry Clinker |
| SiO$_2$ | 13.56 | 20.88 | 22.16 |
| Al$_2$O$_3$ | 3.84 | 5.92 | 5.57 |
| Fe$_2$O$_3$ | 1.82 | 2.80 | 3.06 |
| CaO | 43.41 | 66.87 | 65.80 |
| MgO | 0.59 | 0.91 | 0.83 |
| SO$_3$ | 0.92 | 1.42 | 0.22 |
| Na$_2$O | 0.25 | 0.39 | 0.20 |
| K$_2$O | 0.53 | 0.82 | 0.44 |
| L.O.I.* | 35.08 | | 1.0 |
| Total | 100.00 | 100.01 | 99.34 |

*Loss on ignition Free CaO

The cement plant in Mississippi was designed to produce 6,000 barrels per day of cement and no greater capacity had been obtainable from the plant employing conventional manufacturing procedure.

The kiln feed was converted to a 50–50 mix of the respective materials and the slurry. The results are set forth in Table X. The difference between the loss free composition and the final clinker composition in Table X represents a minor amount of coal ash and silica that has been integround with and burned with the coal. The slurry had the same composition as Table IX.

Table X

| | MIX COMPOSITION | | | |
|---|---|---|---|---|
| | | Weight Percent | | |
| Compound | Chalk | 50–50 Mix* | Loss Free | Clinker |
| SiO₂ | 7.56 | 10.56 | 16.61 | 22.25 |
| Al₂O₃ | 3.68 | 3.76 | 5.91 | 5.48 |
| Fe₂O₃ | 1.61 | 1.72 | 2.70 | 3.06 |
| CaO | 46.10 | 44.76 | 70.39 | 66.53 |
| MgO | 0.82 | 0.71 | 1.12 | 0.85 |
| SO₃ | 1.95 | 1.44 | 2.26 | 0.17 |
| Na₂O | — | 0.13 | 0.16 | 0.16 |
| K₂O | 0.49 | 0.51 | 0.80 | 0.28 |
| L.O.I. | | | | |
| Free CaO | 37.79 | 36.44 | — | 1.0 |
| Total | — | 100.03 | 99.95 | 99.83 |

*Based on dry materials, as noted hereinbefore

A striking phenomenon that was observed was that as the sand, or silica, was interground with and fed into the combustion zone in intimate admixture with the coal, there was a marked change in the appearance of the coal flame. Even when the coal and the silica admixture contained 31.6 percent noncombustibles, the flame became shorter, brighter, hotter, more crisp and lively in appearance. Conventional poor quality fuels with this high a proportion of noncombustibles will hardly support combustion! While this invention is not to be limited to the consequences of any theory, it is theorized that the sand acted as a dispersing agent when it was interground with and intimately admixed with the coal such that the coal particles were separated and surrounded more thoroughly by the primary air to obtain fast and complete combustion. Moreover, the silica particles radiated energy back into the respective coal particles for more nearly complete combustion and a concentration of the heat for more efficient burning of the cement clinker. In addition, the silica became liquefied and so chemically excited that the chemical reactions in which it was involved greatly increased in speed.

The quality of the cement clinker produced was excellent even though the reaction time for the third mixture silica introduced into the combustion zone to form clinker with the calcareous material was extremely short by conventional standards. The excellent quality of the cement clinker was even more surprising in view of the coarseness of the respective materials.

The energy requirements to produce a barrel of cement decreased from the conventional 1,200,000 BTU per barrel to an average of about 850,000 BTU per barrel when the mixture of slurry and dry material was fed into the kiln with the fourth mixture silica being interground with and burned with the coal.

The kiln was then converted to employing a feed of only the large size respective materials having particle sizes up to one-fourth inch in diameter.** Table XI summarizes the results. The runs produced excellent cement clinker.

Table XI

| Composition** | Chalk | Loss Free Chalk | Average Clinker* |
|---|---|---|---|
| SiO₂ | 7.56 | 12.15 | 22.36 |
| Al₂O₃ | 3.68 | 5.92 | 5.55 |
| Fe₂O₃ | 1.61 | 2.59 | 2.91 |
| CaO | 46.10 | 74.10 | 66.35 |
| MgO | 0.82 | 1.32 | 0.87 |
| SO₃ | 1.95 | 3.13 | 0.19 |
| Na₂O | — | — | 0.25 |
| K₂O | 0.49 | 0.79 | 0.34 |
| L.O.I. | | | |
| Free CaO | 37.79 | — | 1.0 |
| Total | 100.00 | 100.00 | 99.82 |

*Average 6 samples
**Having about the same particle size distribution as shown in Table VII The controls in the Example operate as described hereinbefore; in which respective samples are taken each 15 seconds and integrated into an overall sample that is analyzed each 15 minutes. In the kiln sample analyses, the predetermined analysis included a correction for coal ash at the Mississippi plant. Specifically, the coal was sampled and its ash content determined. The amount of ash at the coal feed rate was then used to alter the desired composition of the cement clinker. The difference between the samples and the predetermined analysis indicated the amount of the additional ingredients needed. In these runs, the additional ingredients were supplied by the silica interground in intimate admixture with the coal. The proportions of coal and silica were adjusted to give the newly calculated feed rate of silica. The control was good. The controllers increase or decrease the respective proportioning feeders to achieve the new desired proportions of ingredients and make up the deficiencies, all as delineated hereinbefore with respect to the individual pre-kiln sampler, kiln sampler, and clinker sampler.

Moreover, the energy costs were further reduced to only 650,000 BTU's per barrel of cement employing only the large size dry material as the feed.

The intergrinding of the finely ground fourth mixture and the coal has been described hereinbefore. It is not necessary that they be so interground, since each can be fed separately, particularly when a minor amount of the total materials of the cement clinker will be comprised of the fourth mixture. It is preferable to intimately admix the two, although even that may be foregone with the minor amounts of the finely ground fourth material. For example, separate pipes and means for introducing the finely ground fourth material into the combustion zone could be employed, similarly as described hereinbefore with respect to the more coarsely ground third mixture.

This invention is particularly advantageous where mixtures are employed wherein there is a naturally occurring small grain size; and wherein the impurity level is high enough to make the mixtures feasible; for example, more than 20 percent impurity in either the calcareous material, or the second mixture employing either the argillaceous and/or siliceous material. It is preferred that the siliceous material include aluminum and iron in the mixture. The presence of natural fluxes, such as the chlorides, pyrites, inorganic sulfates and the like also improve this process. Care should be taken in employing the process where there is high purity constituents with less than 10 percent impurity being employed; particularly, where there are metamorphosed, large grain size materials, such as high purity calcium carbonate, high purity quartzitic sand and high aluminum clays having very little iron content.

The rapid analysis means has been described as an x-ray analyzer that employs x-ray fluorescence. Any of the other rapid analysis means that are commercially available may be employed. For example, alpha particle bombardment with measurement of the x-ray emission has been developed recently and should provide a suitable analysis means.

While this invention has been described hereinbefore with respect to using a particulate fuel, other fuels such as natural gas can be employed in this invention as shown in the Example.

This invention has been described with respect to having the first mixture contain the calcareous material and the other mixtures contain the siliceous, or argillaceous, material, since this appears to be the most advantageous way to practice this invention. If desired, however, the proportion of ingredients may be controlled by increasing and decreasing the calcareous material instead of the siliceous material.

From the foregoing, it can be seen that the savings in fuel and the reduced cost of comminution of the respective materials portends extremely significant savings over conventional manufacturing processes.

Historically, when a plant designed and employed in a wet process was converted to a dry process there has been a tremendous increase in the dust that was thrown off. For example, the literature is replete with instances where up to 20 to 30 percent by weight of the dry mix has been thrown off as dust particles. A large portion of this dust has to be trapped out upstream of the precipitators and returned to the cement operation at some point. In contrast, the more coarsely ground respective materials forming the feed in these runs had a dust throw off of less than 5 percent of the feed.

From the foregoing, it can be seen that this invention effects the objects delineated hereinbefore, provides a method of manufacturing cement having a plurality of the features delineated hereinbefore as desirable and not heretofore provided by the prior art. Specifically, this invention provides method and apparatus for manufacturing cement that enables converting existing facilities into this new low cost method of making cement. This invention provides method and apparatus that can reduce fuel requirements up to almost 50 percent of that formerly demanded by conventional wet processes while maintaining dust throw off to less than one-fourth of that of the prior art. Moreover, this invention enables tremendous savings in the cost of comminution of the feed material fed to the kiln.

Although this invention has been described with a certain degree of particularity, it is understood that the present disclosure is made only by way of example and that numerous changes in the details of construction and the combination and arrangement of parts may be resorted to without departing from the spirit and the scope of this invention.

What is claimed is:
1. A method of manufacturing portland cement comprising the steps of:
   a. providing a source of a first mixture including calcareous material that is coarsely ground and can contain sizes up to 3/8 inch in lateral dimension for a cement;
   b. providing a second source of a second mixture including at least one of an argillaceous material that is coarsely ground and can contain sizes up to one-fourth inch in lateral dimension and a siliceous material that is coarsely ground and can contain sizes up to one-fourth inch in lateral dimension;
   c. admixing a first rate of said first mixture from said first source and a second rate of said second mixture from said second source, and conveying and introducing in an on-line process said first and second mixtures to the feed end of a kiln for producing cement clinker when reacted at a high temperature as they traverse down the kiln; said first and second mixtures being so constituted as to prepare a desired balanced portland cement clinker when admixed in the proper proportions; said first and second rates being such that said proper proportions of said first and second mixtures are fed into the feed end of said kiln;
   d. repeatedly sampling said first and second mixtures being conveyed toward said feed end of said kiln at a pre-kiln location upstream of said feed end;
   e. analyzing the respective samples collected at said pre-kiln location;
   f. automatically comparing the analyses of said respective samples with a predetermined analysis to thereby define a deficiency of ingredients with respect to said balanced portland cement clinker;
   g. adjusting in said on-line process said proportion of said first and second mixtures coming from respective first and second sources to form new said proportions to correct each said deficiency;
   h. repeatedly sampling the materials in said kiln at a predetermined point downstream from said feed end;
   i. analyzing by rapid analysis means respective samples collected at said downstream point;
   j. automatically comparing the analysis of respective samples with a predetermined analysis to thereby define a deficiency of ingredients with respect to said balanced portland cement clinker;
   k. after a predetermined time interval after respective said sampling of step h., introducing into a combustion zone of said kiln at a third rate a third mixture and a fuel and burning at least said fuel; said third rate of said third mixture being that which will supply the deficiency of ingredients as determined from said samples at the predetermined point downstream from the feed end of said kiln; said third mixture including at least one of calcareous, argillaceous, and siliceous materials that is coarsely ground and can obtain sizes up to 1/8 inch in lateral dimension; said predetermined time interval being determined by kiln residence time from the predetermined point downstream of the feed end where the samples are taken to the discharge end of the kiln;
   l. repeatedly sampling the final cement clinker coming out of the discharge end of said kiln;
   m. analyzing the respective samples of final cement clinker to thereby define a deficiency of ingredients with respect to said desired balanced portland cement clinker; and
   n. introducing into said combustion zone of said kiln at a fourth rate a fourth mixture that is finely ground and of a size −100 mesh; said fourth rate of said fourth mixture being that required to supply the deficiency of ingredients defined by the analysis of said samples of said final cement clinker; said fourth mixture being finely ground so as to react relatively rapidly and enable obtaining a fine degree of control heretofore unavailable.

2. The method of claim 1 wherein said first and second mixtures are introduced into the feed end of said kiln concomitantly with a predetermined proportion of slurry; said slurry containing balanced ingredients for providing said balanced predetermined cement clinker after traverse through said kiln and reaction at said high temperatures therewithin.

3. The method of claim 1 wherein said second mixture contains more than 75 percent of the at least one of said argillaceous material and siliceous material for forming a balanced cement clinker and less than the remaining 25 percent is added by said third and fourth mixtures being introduced into the combustion zone.

4. The method of claim 1 wherein said second and third mixtures contain siliceous material; said siliceous material being quarry run sand that does not require further grinding before being introduced into the feed end of said kiln.

5. A method of manufacturing portland cement in which a balanced portion cement clinker is formed comprising:
   a. introducing into the feed end of a kiln of a kiln system at a first rate a first mixture including calcareous material for a cement; and at a second rate a second mixture including at least one of argillaceous material and siliceous material for said cement;
   b. introducing into a combustion zone of said kiln at a third rate a third mixture and a fuel and burning at least said fuel; said first, second and third mixtures being complementary so as to form a balanced cement clinker for said cement;
   c. employing an on-line control process and maintaining said first, second and third mixtures complementary so as to form said balanced portland cement clinker before it is discharged from said kiln and including the steps of;
      i. sampling the material in the kiln system at at least one predetermined point;
      ii. analyzing by a rapid analysis means the respective samples collected;
      iii. automatically comparing the analyses of respective samples with a predetermined analysis to thereby define a deficiency of ingredients with respect to said balanced portland cement clinker; and
      iv. altering the proportions of said mixtures in said kiln system to supply said deficiency such that said balanced cement clinker is formed during the traversal of said kiln; and
   d. discharging from said kiln said balanced cement clinker for further processing to the desired final form of said cement.

6. The method of claim 5 wherein said first mixture is a coarsely ground first mixture including particles that can be up to 3/8 inch in lateral dimension.

7. The method of claim 6 wherein said second mixture includes siliceous material and said siliceous material is a straight run quarry sand without additional grinding and may include particles up to 1/4 inch in lateral dimension.

8. The method of claim 5 wherein said second mixture includes straight run quarry sand without additional grinding and that may have particle sizes up to one-fourth inch in lateral dimension.

9. The method of claim 5 wherein said third mixture is intimately admixed with a particulate fuel to form a fourth mixture and said fourth mixture also serves to enhance the brightness of the flame of burning the fuel and to increase the local temperature of the burning.

10. The method of claim 9 wherein said intimate admixing is effected by intergrinding said third mixture and said particulate fuel.

11. The method of claim 10 wherein said intergrinding is carried out such that said finely ground said third mixture is of size −100 mesh.

12. The method of claim 5 wherein said first and second mixtures and a conventional cement slurry are fed into said feed end of said kiln in predetermined proportions.

13. The method of claim 12 wherein said predetermined proportions comprise about 50 percent by weight of dry materials in said slurry and about 50 percent by weight of dry materials in said coarsely ground first and second mixtures.

14. The method of claim 5 wherein said second and third mixtures are the same; and said second rate of said second mixture is a major portion of the total said second mixture required to form said balanced cement clinker; and said third rate of said third mixture is only a minor portion thereof.

15. The method of claim 14 wherein said major portion is more than 75 percent by weight of said total second mixture; and said minor portion is less than 25 percent by weight thereof.

16. The method of claim 14 wherein said major portion is within the range of 90–95 percent and said minor portion is within the range of 5–10 percent.

17. The method of claim 5 wherein said altering of said proportions is effected by conforming said third mixture to that required to supply said deficiency of ingredients.

18. The method of claim 5 wherein said third mixture comprises at least one of a finely ground said mixture and a coarsely ground said mixture.

19. The method of claim 18 wherein said third mixture comprises both a coarsely ground said mixture and a finely ground said mixture.

20. The method of claim 19 wherein there is employed an on line control process comprising the steps of:
   a. sampling materials in said kiln at a first location downstream from said feed end and upstream of the discharge end of said kiln;
   b. analyzing by a rapid analysis means the respective samples collected at said first location;
   c. automatically comparing the analyses of respective samples with a predetermined analysis to thereby define a deficiency of ingredients with respect to said balanced portland cement clinker;
   d. after a predetermined time interval after sampling, conforming said coarsely ground third mixture to that required to supply the deficiency of ingredients; said predetermined time interval being determined by kiln residence time;
   e. sampling the final cement clinker coming out of the discharge end of said kiln;
   f. analyzing the respective samples of said final cement clinker to thereby define with respect to a desired cement clinker composition, a deficiency of ingredients; and
   g. conforming said finely ground said third mixture to that required to supply the deficiency of ingredients; said finely ground said third mixture reacting relatively rapidly to rapidly bring the cement clinker composition to the desired composition.

* * * * *